US006707917B1

(12) United States Patent
Landgraf et al.

(10) Patent No.: US 6,707,917 B1
(45) Date of Patent: Mar. 16, 2004

(54) MONAURAL AND STEREO AUDIO SIGNAL CONTROL SYSTEM

(75) Inventors: Henry S. Landgraf, Cherry Hill, NJ (US); Anthony Troiano, Princeton Junction, NJ (US); Dipakkumar R. Patel, Hatboro, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/328,906

(22) Filed: Jun. 9, 1999

(51) Int. Cl.[7] ............................. H04H 5/00; H04R 5/00
(52) U.S. Cl. ............................................. 381/11; 381/1
(58) Field of Search .................................. 381/11, 1–12

(56) References Cited

U.S. PATENT DOCUMENTS

| 4,603,349 A | 7/1986 | Robbins ...................... 358/86 |
| 4,628,358 A | 12/1986 | Robbins ..................... 358/121 |
| 4,646,150 A | 2/1987 | Robbins et al. ............. 358/144 |
| 4,956,862 A | 9/1990 | Robbins et al. ............... 380/19 |

Primary Examiner—Minsun Oh Harvey
Assistant Examiner—Elizabeth McChesney
(74) Attorney, Agent, or Firm—Steven L. Nichols; Ronald P. Kananen; Rader, Fishman & Grauer PLLC

(57) ABSTRACT

A monaural and stereo audio signal control system for use in cable-signal set-top boxes selects signal processing paths as a function of the monaural and stereo nature of the incoming audio component of the television signal and an indication as to whether the audio component is a "clear" or "masked" signal. A clear audio signal is a signal that conforms to a NTSC or BTSC standard that can be processed by a conventional television receiver while a "masked" signal is one in which the carrier frequency has been changed or otherwise modified so that a conventional television receiver cannot extract the audio content. A signal-processing path is provided for conventional clear monaural and stereo audio and for a masked monaural signal and for a masked stereo signal. Monaural clear and masked processing is addressed by microprocessor controlled switching in accordance with control information provided in the television signal and stereo masked processing is addressed by the presence or absence of energy corresponding to the masked stereo carrier.

21 Claims, 3 Drawing Sheets

MONAURAL AND STEREO AUDIO SIGNAL CONTROL SYSTEM

BACKGROUND OF THE INVENTION

The present invention relates to a monaural and stereo audio signal control system for use in television signal distribution systems and, more particularly, to such audio control systems in cable television distribution systems.

Various systems have been developed for the distribution of television signals to viewers. These systems include conventional local-area radio frequency broadcast, distribution by cable, and wide-area satellite broadcast. In general, television signals that include content that is considered objectionable are subject to government regulation and/or industry self-regulation to prevent viewing by unauthorized persons, particularly children.

Conventional television signals include a video and an audio component; the audio component is presented via a modulated FM carrier for both monaural sound and/or stereo sound. In the earliest days of cable television, the cable TV provider distributed TV signals from a headend facility into the subscriber's location via a set-top box. The cable television provider typically transmitted a number of channels greater than that provided by the area broadcast stations. The subscriber selected the desired channel which was then passed through the set-top box to the television receiver. The set-top box functioned essentially as a tuner for the many signals provided from the headend.

Later, with the advent of channels that carried objectionable content, the cable television provider scrambled the video component by changing the timing/position of the horizontal synchronization pulses or otherwise interfering with the video feed sent to the set-top box. The set-top box was provided with a subscriber processing section that enabled the authorized subscriber to control the set-top box to descramble the video signal for presentation to the television receiver. However, unauthorized viewers, e.g., children of the subscriber, could disconnect the cable from the set-top box and then reconnect the cable directly to the signal input of the television receiver and then tune the television receiver to the desired channel. While the scrambled video signal could not be viewed, the audio content was available. Oftentimes, the audio content was also considered objectionable when heard by children.

In order to prevent unauthorized users from listening to the audio component of the objectionable television signal, the cable television supplier also altered the audio component of the television signal. In the case of a monaural audio component, the carrier frequency of the FM audio signal was shifted. In the case of a stereo audio component, a second FM carrier with the audio component was added to the television signal. In either case, the audio component could not be demodulated within a conventional television receiver. Thus, disconnecting the cable from the set-top box and directly connecting the cable to the input of the television and tuning to an objectionable channel would cause the receiver to display the scrambled, unviewable video component without any meaningful audio component.

The set-top boxes were manufactured in accordance with the type of audio signal to be processed. During the time period in which monaural sound was dominant and stereo sound was only a small portion of the market, set-top box manufacturers would manufacture two separate product lines, one for monaural sound and the other for stereo sound.

FIG. 2A represents the audio processing path in a prior art monaural-only set-top box, and FIG. 2B represents the audio path in a prior art stereo-only set-top box. In both FIG. 2A and in FIG. 2B, the audio component of the television signal can be transmitted from the headend in either a 'clear' mode or a 'masked' mode. In the clear mode, the audio component can be demodulated and processed by a conventional NTSC television receiver. In the masked mode, the audio component of the television signal is modified at the headend by the cable TV operator so that it is not demodulatable by a conventional TV receiver. The masked form of the signal has been commonly referred to as a "privacy" mode.

In the monaural-only system of FIG. 2A, the audio component of the television signal from the headend can be transmitted to the set-top box in either the clear form or in the masked form. The clear signal conforms to the applicable signal standard (i.e., NTSC, PAL, etc.) in which the audio component is modulated on the sound carrier according to the signal standard or specification. The "masked" frequency corresponds to a frequency twice the horizontal sweep frequency (2H). The clear signal can be processed normally in a conventional TV receiver while the masked 2H signal cannot be properly demodulated and processed.

As shown in FIG. 2A, the monaural-only set-top box includes processing, designated by the reference character 10, designed to process the monaural audio associated with a clear signal and to process the monaural audio associated with a 2H masked audio signal.

The monaural processing system 10 includes a RF input 12 that provides the cable-supplied signals to a tuner 14, which, in turn, provides the selected signal to an intermediate frequency section 16. The output of the intermediate frequency section 16 is then provided to a down converter 18 and to a FM detector 20 that recovers the modulation envelope from the transmitted audio and presents that audio component to a clear signal path or a 2H masked path. The clear path includes an amplifier 22. The 2H path includes a 2H band-pass filter 24 that conveys the filtered signal to a detector 26, to a low-pass filter 28, and to an amplifier 30. The respective outputs of the clear path amplifier 22 and the masked path amplifier 30 are provided to a clear/masked select switch 32. The clear/masked select switch 32 is under the control of a microprocessor 34 that receives control information via a DATA input. The control information provided to the DATA input is provided by digital information impressed on the incoming video signal, typically on the portion of the retrace subsequent to the vertical synchronization pulse. The selected output of the clear/mask switch 32 is provided to an output amplifier 36 which provides its output to the audio-out connector 38 of the set-top box for connection to the subscriber's television receiver.

During operation in which the signal from the headend has not been masked by the headend operator, the output of the FM detector 20 is provided through the amplifier 22 to the clear/masked select switch 32. The microprocessor 34, in response to control information provided on its DATA input, selects the clear signal for presentation through the amplifier 36 to the audio output connector 38.

During operation in which the signal from the headend has been masked, the output of the FM detector 20 is provided to the 2H band-pass filter 24 which conveys the filtered signal to the detector 26, to the low-pass filter 28, and to the amplifier 30. The output of the amplifier 30 is then presented to the clear/masked select switch 32. The microprocessor 34, in response to the control information provided to its DATA input, selects the output of the amplifier 30 for inputting to the amplifier 36 and presentation to the audio output connector 38.

In the event an unauthorized user, e.g., the children of the subscriber, attempts to circumvent the set-top box by disconnecting the cable input from the RF input 12 and connecting the cable directly to the television receiver, no intelligible audio will be provided when a masked audio component is being supplied by the headed operator.

The stereo system of FIG. 2B functions in a manner similar to that of the monaural system of FIG. 2A, but processes a clear or masked stereo signal in accordance with the BTSC (Broadcast Television System Committee) standard for multi-channel television sound (MTS). Under these standards, a "masked" stereo signal is transmitted on a second FM carrier.

As shown in FIG. 2B, the stereo-only set-top box includes processing, designated by the reference character 50, designed to process the stereo audio associated with a clear signal and to process the stereo audio associated with a "masked" second-carrier audio signal. The stereo processing system 50 includes a RF input 52 that provides the cable-supplied signals to a tuner 54, which, in turn, provides the selected signal to an intermediate frequency section 56. The output of the intermediate frequency section 56 is then provided to a down converter 58 for presentation to a "clear" stereo path or a "masked" stereo path. The "clear" stereo path includes a band-pass filter 60 that provides the filtered signal to an FM detector 62 with the demodulated output provided to an amplifier 64. The "masked" path stereo path includes a band-pass filter 68 that provides the filtered signal to a detector 70 that demodulates the audio information provided on the second carrier and provides that audio information through a low-pass filter 72 to an amplifier 74. The output of the amplifiers 64 and the amplifier 74 are provided to a clear/masked select switch 76 that is controlled by a microprocessor 78. The microprocessor 78 selects either the output of the amplifier 64 or the output of the amplifier 74 in response to control information presented to its DATA input with the selected signal provided via amplifier 80 to the output terminal 82.

During operation in which the stereo signal from the headend has not been masked by the headend operator, the output of the down converter 58 is provided through the band-pass filter 60 to the FM detector 62 and the amplifier 64 to the clear/masked select switch 76. The microprocessor 78, in response to control information provided on its DATA input, selects the output from the amplifier 64 for presentation through the amplifier 80 to the audio output connector 82.

During operation in which the signal from the headend has been masked, the output of the down converter 58 is provided through the band-pass filter 68 to the detector 70 and the low-pass filter 72 to the amplifier 74 to the clear/masked select switch 76. The microprocessor 78, in response to the control information provided to its DATA input, selects the output of the amplifier 74 for amplification by the amplifier 80 and presentation to the audio output connector 82.

In the event an unauthorized user, e.g., the children of the subscriber, attempts to circumvent the set-top box by disconnecting the cable input from the RF input 52 and connecting the cable directly to the television receiver, no intelligible audio will be provided when a masked stereo audio component is being supplied by the headend operator. A clear audio component will be demodulated and processed in the usual manner.

The prior art processing of FIGS. 2A and 2B was implemented in separate set-top boxes and supplied to the market in response to demand. Since stereo-capable systems have come to dominant the market, a need has arisen for a set-top box that is both monaural and stereo capable and able to function in response to clear and masked audio in each operating regime.

In view of the change in market demand from predominantly monaural to predominately stereo, the production of two separate set-top boxes, one monaural and the other stereo, is no longer justified from a competitive perspective.

SUMMARY OF THE INVENTION

In view of the above, it is an object of the present invention, among others, to provide a monaural and stereo audio signal control system for a cable television set-top box that automatically processes a monaural or stereo audio component of a television signal or a frequency-modified monaural or stereo audio component of a television signal.

An audio processing system for automatically processing both clear and masked audio signals of either the monaural or stereo type in accordance with the present invention includes a first processing path for clear monaural and clear stereo audio signals, a processing path for masked monaural audio signals, and a path for masked stereo audio signals.

The system includes a front end having a tuner, an intermediate frequency section, and a down-converter that processes all incoming audio signals. The down-converted signals are then presented to the several processing paths for processing in accordance with the type of audio signal received.

The monaural masked path subjects the signal to pre- and post-detector filtering and presents the detected and filtered output to a masked monaural/stereo selection switch. The masked stereo path likewise includes pre- and post-detector filtering and similarly presents its detected and filtered output to the masked monaural/stereo selection switch. A bandpass filter is provided in the masked stereo processing path and functions to detect the signal energy of those signal components that identifies a signal as a masked stereo signal. When this energy is detected, the masked monaural/stereo switch is appropriately actuated to route the masked stereo audio signal for further processing.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
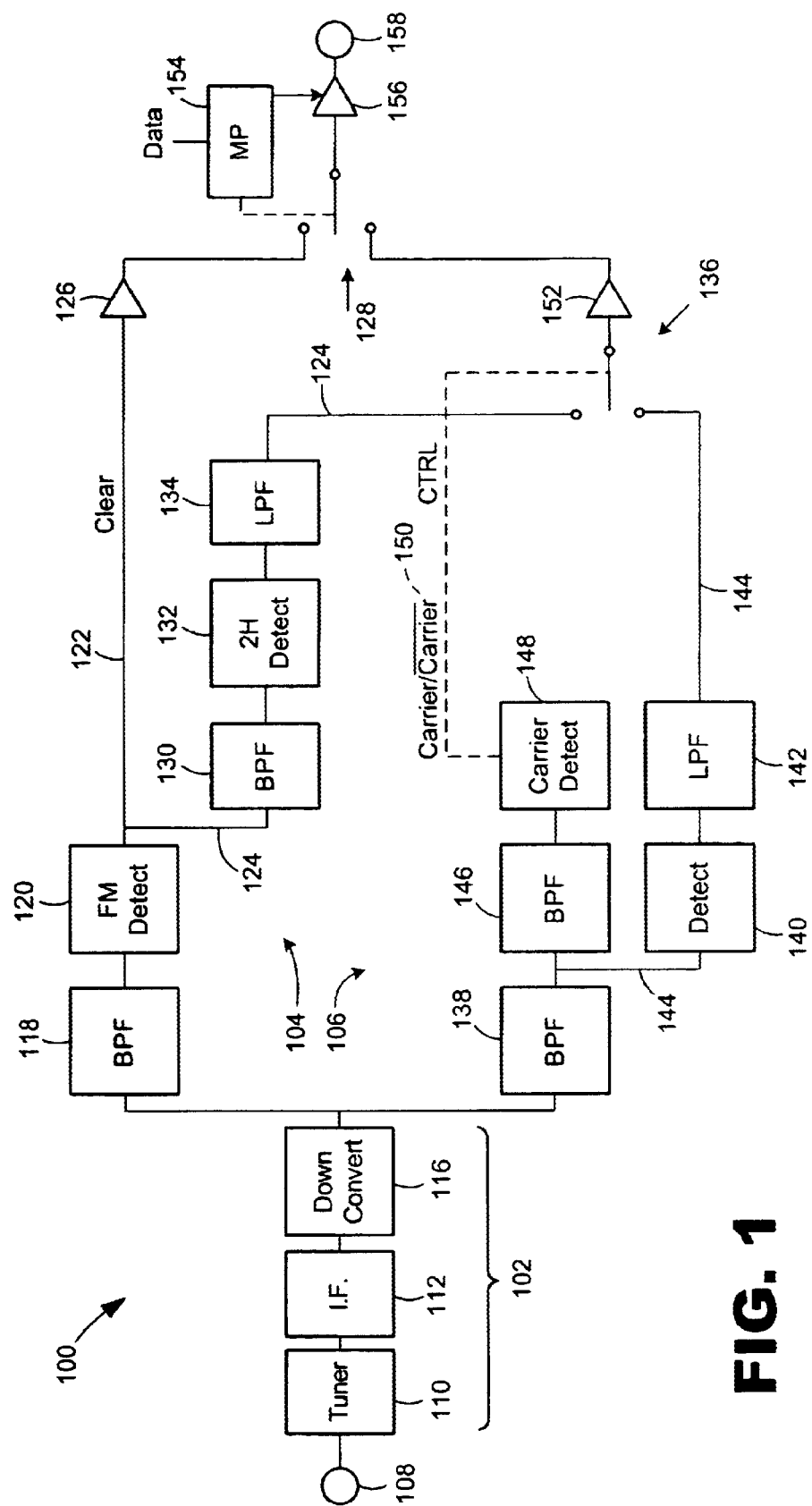
FIG. 1. is a block diagram of a combined monaural/stereo audio signal control system for a cable television set-top box in accordance with the present invention.
Figure 2A:
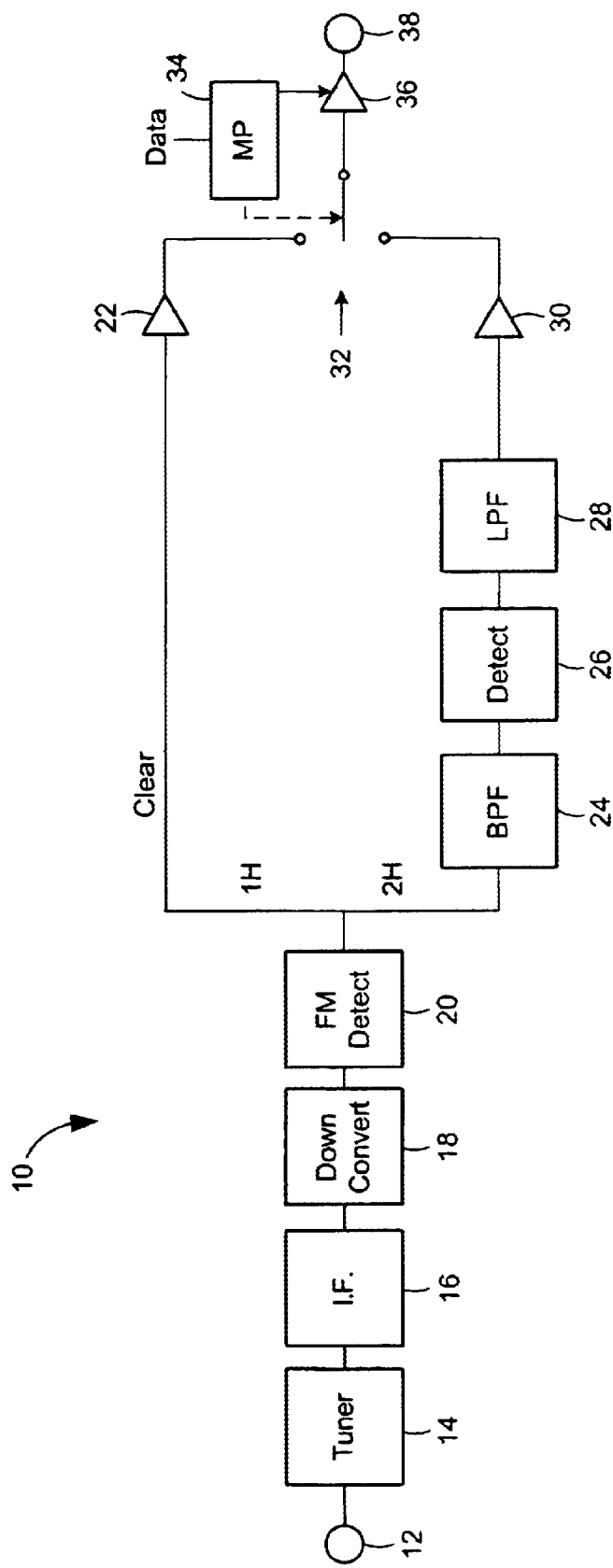
FIG. 2A is a simplified block diagram of a prior art monaural audio signal control system for a cable television set-top box.
Figure 2B:
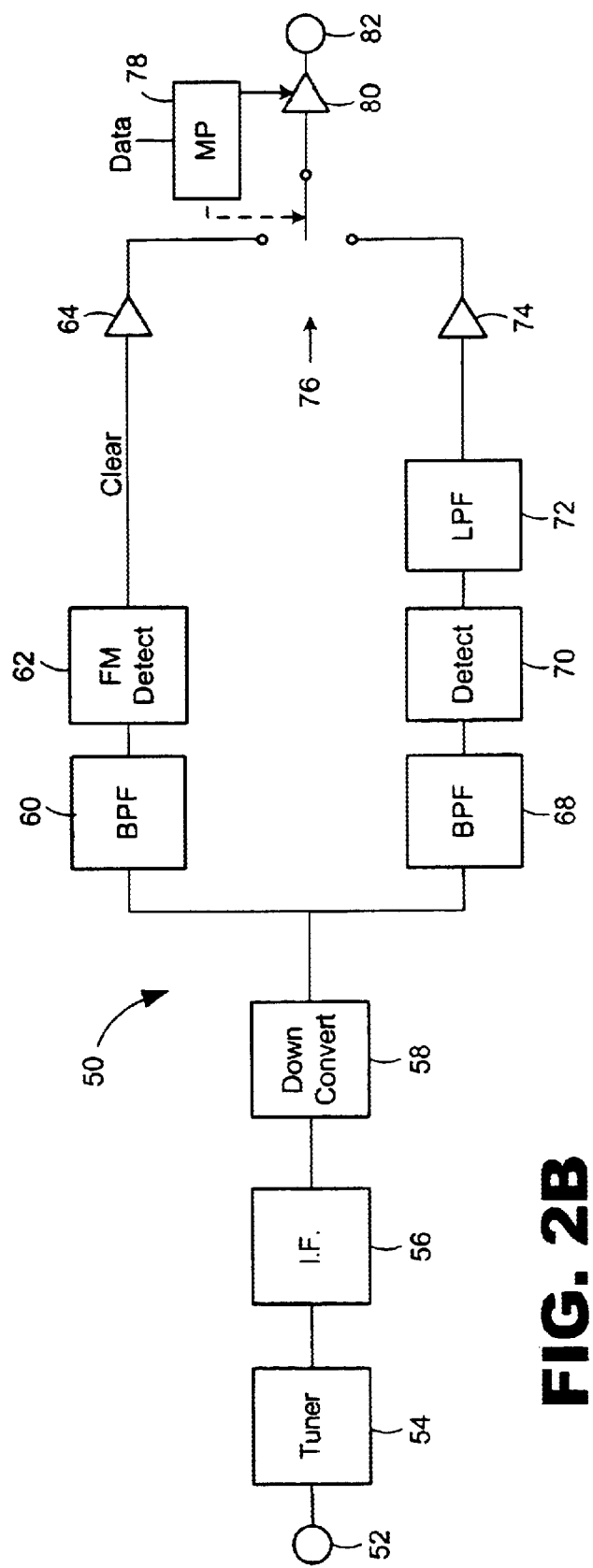
FIG. 2B is a simplified block diagram of a prior art stereo audio signal control system for a cable television set-top box.

An audio processing system for automatically processing both clear and masked audio signals of either the monaural or stereo type in accordance with the present invention is shown in FIG. 1 and designated generally therein by the reference character 100. As shown the audio processing system 100 includes a front end 102 that outputs into a monaural processing path 104 and a stereo processing path 106. The front end 102 includes a conventional RF input connector 108 to which the cable is connected and a tuner 110 that provides the selected signal to an intermediate frequency section 112. The output of the intermediate frequency section 112 is then provided to a down converter 116 for presentation to both the monaural processing path 104 and the stereo processing path 106.

The monaural processing path 104 includes a band-pass filter 118 that provides the filtered output to a FM detector 120 with the output of the FM detector 120 provided to a clear path 122 or a monaural masked path 124. The monaural clear path 122 inputs into an amplifier 126 and to a select switch 128. The clear path 122 processes both clear monaural and clear stereo signals through the amplifier 126. Clear stereo signals are subject to signal processing necessary to extract their multi-channel audio content in processing subsequent to that shown in FIG. 1.

The monaural masked path 124 inputs the signal from the FM detector 120 to a band-pass filter 130 for processing through a 2H detector 132 and a low-pass filter 134 for presentation to a switch 136.

The stereo processing path 106 includes a band-pass filter 138 for the frequency-shifted masked stereo carrier that feeds into a detector 140. The demodulated audio from the detector 140 is then presented through a low-pass filter 142 and along path 144 to the switch 136. Additionally, the output of the band-pass filter 138 is also presented to another band-pass filter 146 that is presented to a carrier detector 148 that functions to detect the carrier component of the frequency shifted second carrier upon which the stereo information is impressed during masked stereo processing.

The band-pass filter 146 and the carrier detector 148 thus function to recognized the presence or absence of energy in the pass band of the filter 146 that corresponds to and indicates the presence of the masked stereo carrier. When this energy is detected, the carrier detector 148 provides an output signal CTRL, as either an analog voltage or a current or as a digital value, along a control path 150 to the switch 136. As explained below, the output signal CTRL functions to control the switch 136 to select or not-select the masked output of the detector 140 or the low-pass filter 134. The switch 136 provides its output through amplifier 152 to the select switch 128. The select switch 128 operates under the control of a microprocessor 154 (or other programmable controller or instruction-responsive logic device) that accepts control information on its DATA input and which also effects control of the output amplifier 156. An output connector 158 accepts the output of the amplifier 156 for connection to the television receiver.

The switches 128 and 136 may take the form of a contact-type switch, as represents in symbolic fashion in the figures, a solid-state switch, or a functionally similar device.

During operation of the system of FIG. 1 to receive a monaural clear signal, the microprocessor 154, under the control of its DATA input, functions to control the switch 128 to select the output of the amplifier 126. Accordingly, the clear monaural signal is processed through the band-pass filter 118 and the FM detector 120 along path 122 and the amplifier 126 to the output amplifier 156. As mentioned above, clear stereo signals are also routed along the path 122.

During operation of the system of FIG. 1 to receive a monaural masked signal (i.e., a 2H signal), the microprocessor 154, under the control of its DATA input, functions to control the switch 128 to select the output of the amplifier 152. Since the switch 136 is normally connected to the output of the low-pass filter 134, the 2H monaural signal is processed through the 2H band-pass filter 130, the 2H detector, through the low-pass filter 134, the switch 136, and through amplifiers 152 and 156 to the output connector 158.

During operation of the system of FIG. 1 to receive a stereo masked signal, the microprocessor 154, under the, control of its DATA input, functions to control the switch 128 to select the output of the amplifier 152. The carrier detector 148, in response to the output of the bandpass filer 146, detects energy corresponding to the masked stereo carrier that causes the switch 136 to switch to the output of the low-pass filter 142 so that the stereo masked signal is passed through the switch 136 to the amplifiers 152 and 156 to the output 158.

The band-pass filter 138 is designed to have a pass band that passes only the desired carrier signal with its sidebands to allow for optimum audio signal quality. However, the band-pass filter 146 has a somewhat narrower pass band than that of the filter 138 in order to reject any adjacent unwanted carriers and sidebands. A somewhat decreased pass band for the band-pass filter 146 will also reject any undesired noise for more reliable carrier detection.

The present invention advantageously provides a monaural and stereo audio signal control system for use in a set-top box for processing cable television signals that functions to processes monaural and stereo clear and masked signals in a cost efficient manner.

As will be apparent to those skilled in the art, various changes and modifications may be made to the illustrated monaural and stereo audio signal control system of the present invention without departing from the spirit and scope of the invention as determined in the appended claims and their legal equivalent.

What is claimed is:

1. An audio signal control system for monaural and stereo clear and masked signals, comprising:
    an input for accepting signals having an audio component the audio component being a clear or masked monaural audio signal or a clear or masked stereo audio signal;
    a first signal processing path for passing clear signals from said input;
    a second signal processing path for passing a masked monaural signal from said input;
    a third signal processing path for passing a masked stereo audio signal from said input;
    a first switching means for selectively connecting either said first signal path or one of said second and third signal paths to a system output; and
    a second switching means for automatically connecting either said second or third signal paths to said first switching means depending on whether said audio component is a masked monoaural signal or a masked stereo signal.

2. The audio control system of claim 1, further comprising means for detecting signal energy associated with a signal processed by said third signal processing path and for actuating said second switching means in response thereto to switch the signal of said third signal processing path to said first switching means.

3. The audio control system of claim 2, wherein said means for detecting comprises a bandpass filter for detecting signal energy uniquely identifying a signal on said third processing path.

4. The audio control system of claim 3, further comprising means for actuating said first switching means to select between said first signal path and the switched output of said second switching means.

5. The audio control system of claim 4, wherein said means for actuating said first switching means comprises a data responsive device responsive to data carried on said signal provided to said input.

6. An audio signal control system for set-top boxes for processing monaural and stereo clear and masked signals, comprising:

first, second, and third signal processing paths for accepting an input signal comprising a clear audio signal, a masked monoaural audio signal or a masked stereo audio signal, said first processing path for passing clear signals, said second signal processing path for passing a masked monoaural signal, and said third signal processing path for passing a masked stereo audio signal;

a first switch for selectively connecting either said first signal processing path or one of said second and third signal processing paths to a system output;

a second switch for automatically connecting either said second or third signal processing paths to said first switching means depending on whether said audio component is a masked monoaural signal or a masked stereo signal; and a switch controller connected to said second switch to cause said second switch to connect said third signal processing path to said first switch in response to a masked stereo signal being processed on said third signal processing path.

7. The audio control system of claim 6, further comprising a system input for providing said input signal to said first, second and third signal processing paths, wherein said system input comprises:

a tuner for tuning and outputting said input signal;

an intermediate frequency stage for processing said input signal from said tuner; and a converter for converting a frequency of said input signal output by said intermediate frequency stage.

8. The audio control system of claim 7, wherein said converter is a down-converter.

9. The audio signal control system of claim 6, wherein said first signal processing path comprises a FM detector.

10. The audio control system of claim 6, wherein said first signal processing path comprises a bandpass filter and a FM detector.

11. The audio control system of claim 6, wherein said second signal processing path comprises a 2H detector.

12. The audio control system of claim 6, wherein said second signal processing path comprises a bandpass filter, 2H detector, and a lowpass filter.

13. The audio control system of claim 6, wherein said third signal processing path comprises a detector for processing a masked stereo signal.

14. The audio control system of claim 6, wherein said third signal processing path comprises a bandpass filter, a detector for processing a masked stereo signal, and a lowpass filter.

15. The audio control system of claim 6, wherein said switch controller comprises means for detecting a stereo masked signal and for causing said second switch to switch to the third processing path in response thereto.

16. The audio control system of claim 15, wherein said switch controller comprises a bandpass filter for filtering energy indicating a carrier of a stereo masked signal and a carrier detector for detecting the stereo masked signal carrier.

17. The audio control system of claim 6, wherein said third signal processing path comprises a first bandpass filter, a detector for receiving the output of said first bandpass filter for processing a masked stereo signal therefrom, and a lowpass filter through which the output of said detector is presented to said second switch and a second bandpass filter for filtering energy indicating a carrier of a stereo masked signal and a carrier detector for detecting the stereo masked signal carrier.

18. The audio control system of claim 17, wherein a pass band of said second bandpass filter is narrower than a pass band of said first bandpass filter.

19. A method of processing a clear or masked monaural or masked stereo audio signal having different modulated-carrier frequencies associated with either a clear or masked signal, comprising:

providing the audio signal to a clear processing path, to a masked monaural and to a masked stereo processing path;

providing a first selectively controllable switch to automatically connect the clear processing path or one of the masked monaural or the masked stereo processing path to a signal output in response to whether said audio signal is clear or masked; and providing a second selectively controlled switch to automatically connect either said masked monaural or masked stereo processing path to said first selectively controlled switch.

20. The method of claim 19, further comprising detecting energy associated with a modulated-frequency carrier for the masked signal.

21. The method of claim 19, further comprising:

detecting energy associated with a modulated-carrier frequency of said audio signal; and controlling said second selectively controllable switch in response to said detecting energy associated with a modulated-carrier frequency of said audio signal.

* * * * *